F1750 XR RE 23,993 BEST AVAILABLE COPY

May 3, 1955 K. HENRICHSEN Re. 23,993

PUMP

Original Filed May 22, 1947 4 Sheets-Sheet 1

INVENTOR.
KNUT HENRICHSEN
BY William R. Lane
ATTORNEY

PUMP

Original Filed May 22, 1947 4 Sheets-Sheet 2

INVENTOR.
KNUT HENRICHSEN

BY William R. Lane
ATTORNEY

INVENTOR.
KNUT HENRICHSEN

BY William R. Lane
ATTORNEY

PUMP

Original Filed May 22, 1947 4 Sheets-Sheet 4

INVENTOR.
KNUT HENRICHSEN
BY
William R. Lane
ATTORNEY

United States Patent Office

Re. 23,993
Reissued May 3, 1955

23,993

PUMP

Knut Henrichsen, Los Angeles, Calif., assignor to North American Aviation, Inc.

Original No. 2,604,856, dated July 29, 1952, Serial No. 749,629, May 22, 1947. Application for reissue December 18, 1953, Serial No. 399,184

4 Claims. (Cl. 103—162)

Matter enclosed in heavy brackets [ ] appears in the original patent but forms no part of this reissue specification; matter printed in italics indicates the additions made by reissue.

This invention relates to a transmission of a hydrostatic generator (or pump) and motor type comprising new and novel features of construction.

It is an object of this invention to provide a variable speed transmission composed essentially of an engine driven generator or pump of variable stroke and a motor of constant stroke.

It is a further object of this invention to provide a light weight compact transmission capable of operating at a relatively high R. P. M. such as may be encountered in connection with modern automotive engines.

It is a further object of this invention to adapt a swash-plate type of pump for use in such a transmission.

It is still a further object of this invention to provide a transmission which operates at a relatively high fluid pressure.

It is yet another object of this invention to provide a swash-plate type of pump with a fluid bearing arrangement for carrying end thrust so as to avoid the use of excessively large antifriction bearings.

It is yet another object of this invention to provide a swash-plate type of pump with a fluid bearing arrangement for carrying end thrust so as to avoid excessively high friction at low R. P. M.

It is still another object of this invention to provide a cylinder grouping in a conical arrangement to obtain compactness and reduce fluid turbulence losses, as well as to reduce valve face friction losses.

It is yet another object of this invention to provide a pump valve arrangement having a spherical valve face thus to obtain self-aligning with an associated cylinder block face and a reduction of radial load on the centering bearing for the cylinder block.

It is still another object of this invention to provide a light weight transmission which will efficiently function in connection with modern automotive engines.

Other objects of invention will become apparent from the following description and the drawings, in which Fig. 1 is a sectional view, with parts in elevation, showing the invention;

Figures 1, 2, 3:
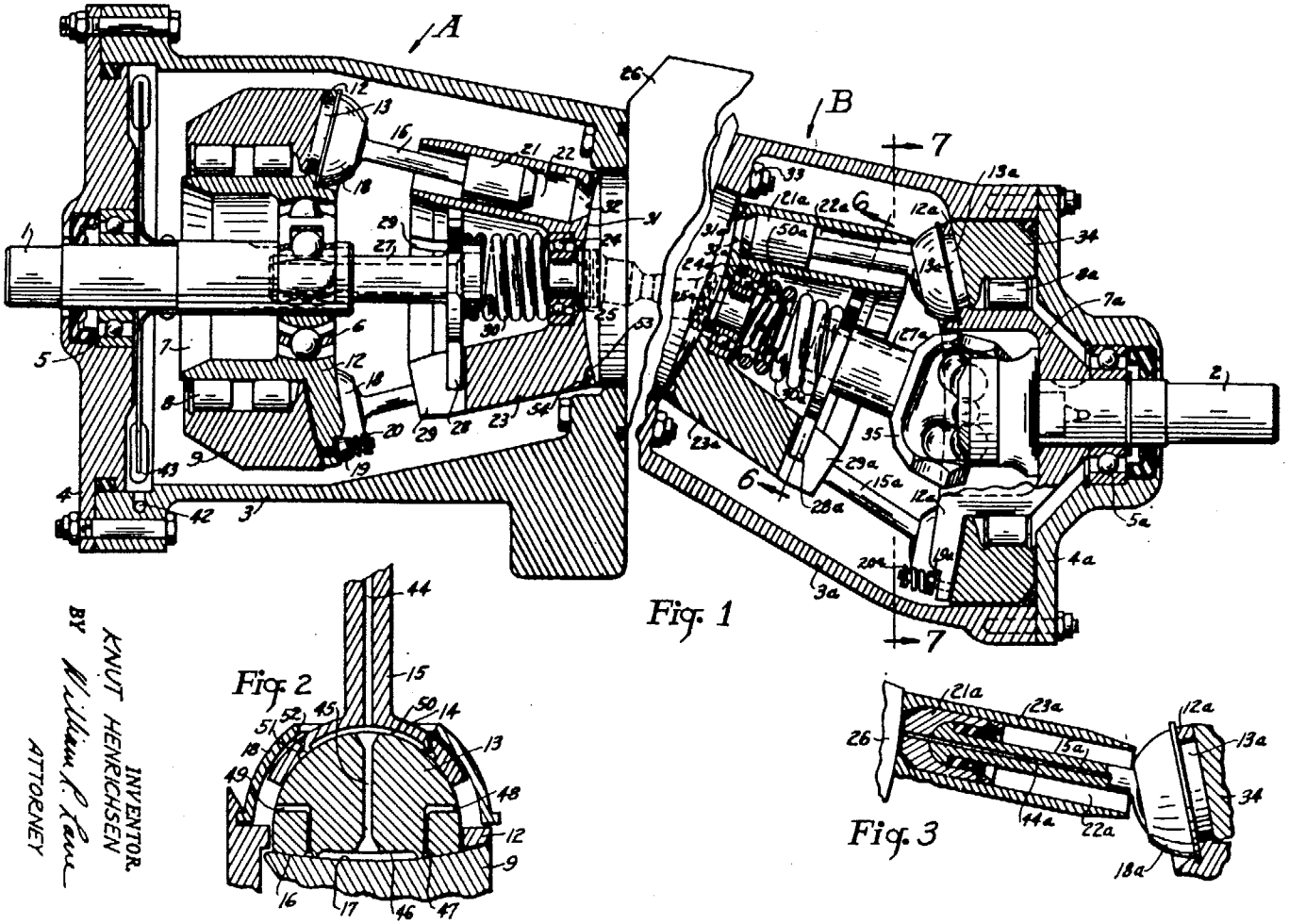
Fig. 2 is an enlarged sectional view of one of the fluid bearing elements.
Fig. 3 is a sectional view, with parts in elevation, of a piston arrangement forming a part of the invention.
Figure 6:
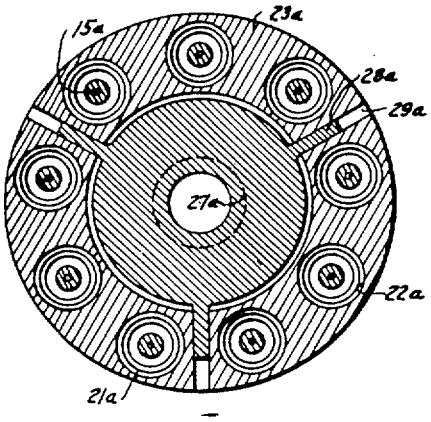
Fig. 6 is a view taken along the line 6—6 of Fig. 1.

Referring to the drawings there is shown in Fig. 1 a generator unit A, a motor unit B, and connections whereby the motor unit is driven by the generator unit. Generally speaking, the generator unit is adapted to be connected by means of shaft 1 to a source of power such as an automotive engine, while the motor unit is adapted to be connected by shaft 2 to a torque tube or drive shaft of an automobile or the like. Shafts 1 and 2 are drivingly connected by the hydrodynamic transmission constituting the present invention.

Figure 7:
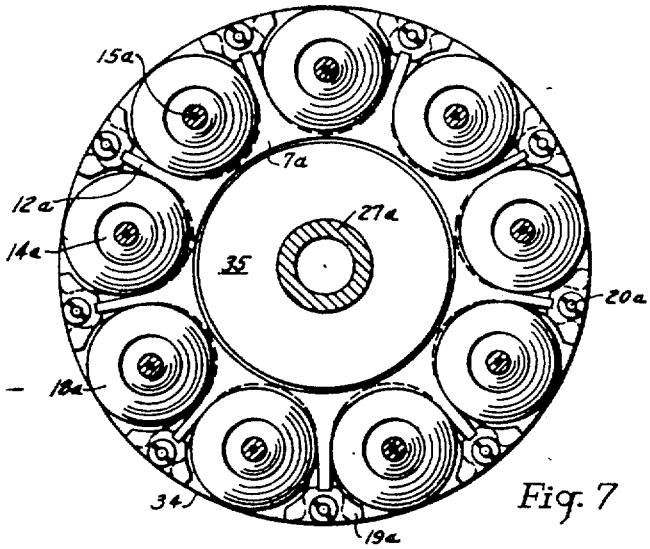
Fig. 7 is a view taken along the line 7—7 of Fig. 1.
Figure 8:
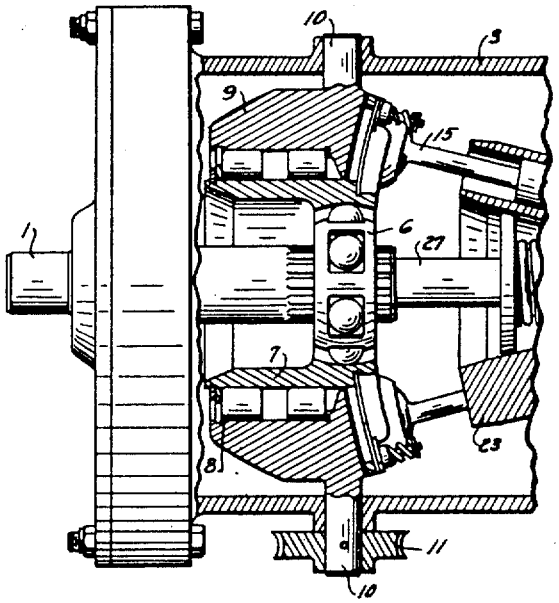
Fig. 8 is a detail view showing means for adjusting the thrust block and bearing unit for controlling the pump stroke; [and]
Figure 10:
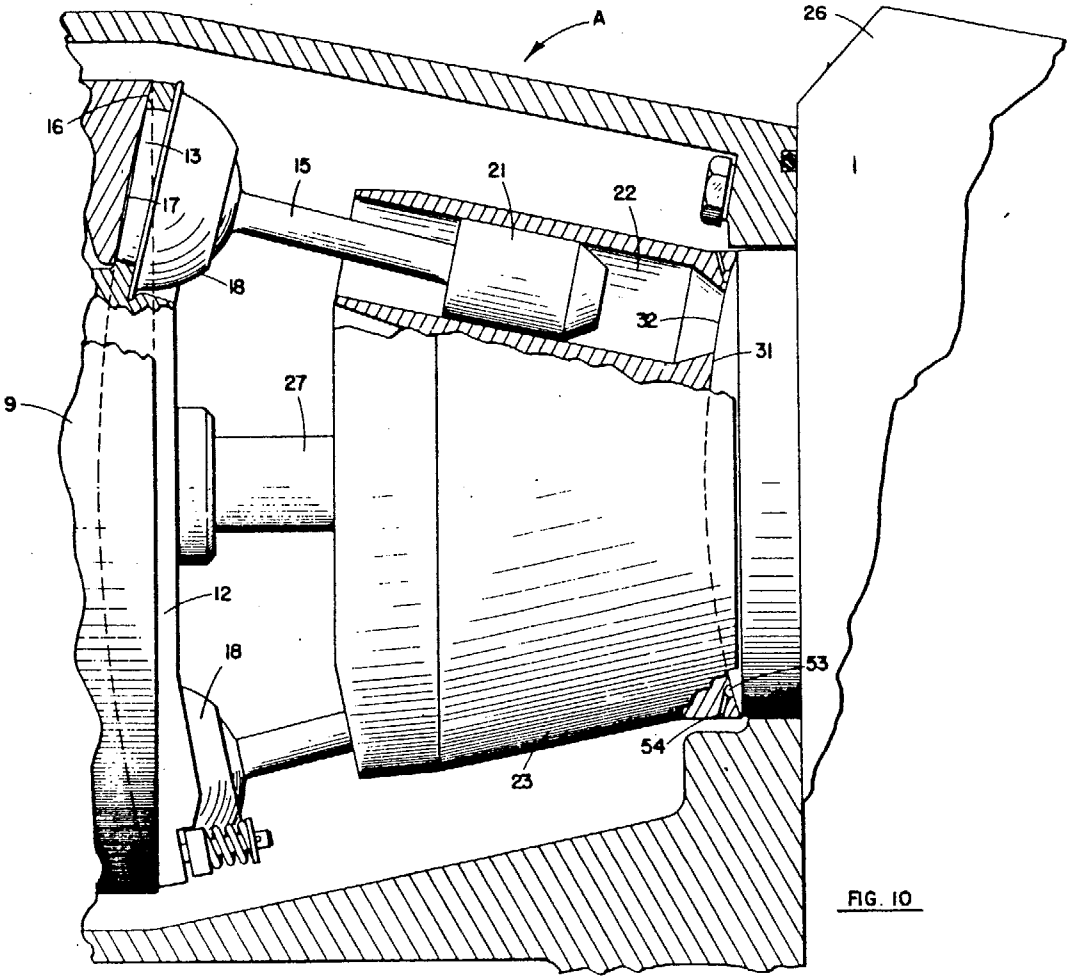
*and Fig. 10 is an enlarged sectional view illustrating the concentric curvature of the thrust block and valve plate, and the fluid bearing means for the cylinder block and valve plate.*

In general, the transmission is constructed as follows: Shaft 1 is rotatably supported in end plate 4 of housing 3 by antifriction bearing 5 and is operatively connected to a hollow shaft 7 by a constant-speed universal joint 6. Such joint is well known in the art and is sometimes referred to as a constant velocity universal joint by reason of the fact that shafts angularly positioned with respect to each other and connected thereby can be made to rotate at equal angular velocities irrespective of the angle at which the shafts are placed with respect to each other. Hollow shaft 7 is rotatably supported by bearings 8 and thrust block 9 which in turn is adjustably mounted in housing 3 (see Fig. 8) by trunnions 10 and gear 11 adapted to be connected to a hand crank or an automatic control mechanism or the like (not shown). Hollow shaft 7 is provided with portions 12 for receiving bearing elements 13 floatingly carried by end portions 14 of connecting rods 15. Bearing elements 13 (substantially hemispherical in form) are provided with a spherical bearing face 16 adapted to cooperate with a corresponding spherical bearing surface 17 on block 9. The end portions 14 are operatively positioned by members 18 of suitable shape which are held in position by suitable member 19 (see Figs. 1 and 7) fastened to hollow shaft 7 by means of pins 20. Connecting rods 15 are each provided with a piston 21 slidably received in cylinders 22 of a cylinder block 23 which in turn is rotatably supported by an antifriction bearing 24 on a shaft 25 supported in turn by being screw-threaded into valve block 26 (see Fig. 4). Shaft 25 is adapted to carry a spring (not shown) identical with spring 50a and adapted to hold the inner bearing race of bearing 24 in place in the same manner that spring 50a holds inner bearing race of bearing 24a in place. Shaft 25a is provided with a suitable split ring or the like adapted to engage the other end of spring 50a. *Spring 50a, interposed between the split ring and the inner race of bearings 24a, can be seen in Fig. 1.* Springs 30 and 30a bear at one of their ends against the outer races of bearings 24 and 24a, respectively. The other ends of these springs bear respectively, against shafts 27 and 27a. Cylinder block 23 is drivingly connected to shaft 1 by means of shaft 27 having a spline or other suitable connection (with some tolerance) with shaft 1 to be driven thereby. Shaft 27 is provided with ears 28 for engaging corresponding recesses 29 in cylinder block 23. Spring 30, placed between cylinder block 23 and shaft 27, operatively positions these parts and at the same time permits a slight amount of movement in respect thereof to permit alignment of cylinder block 23 with its bearing surface 32. It may be noted that the axes of cylinders 22 are angularly arranged to converge at a common point. Accordingly, the corresponding spherical faces 31 and 32 of cylinder block 23 and valve block 26 respectively are made concentric about such point. Similarly, surfaces 16 and 17 on elements 13 and 9, respectively, are concentric about such point when block 9 is adjusted to its neutral position so that the generator piston stroke is zero. The corresponding spherical surfaces on motor parts 13a and 34 are made to the same radius as surfaces 16 and 17 on the generator. The conical arrangement of the cylinders along with the spherical surfaces on valve block 26 and parts 13, 13a and thrust blocks 9 and 34, reduce the load on bearings such as 8, 8a, 24, and 24a.

In the preferred embodiment of the invention generator and motor units are attached to the valve block 26 by a bolt or other suitable means 33 although it is to be understood that the generator and motor units may be separated if desired and driving fluid from the generator unit A conducted, in any suitable manner by tubes or the like, to motor unit B. The valve block or its equivalent may be suitably divided or split and the parts suitably connected by piping. *Of course, generator unit A may be used alone wherever a source of pressurized fluid is needed.*

The motor unit is similar to the generator unit in all respects except for details which will be hereinafter specifically pointed out. Otherwise, parts carrying the suffix "a" correspond to the same reference numeral in respect of generator A. The only substantial difference between the generator and motor units comprises the thrust blocks 9 and 34, block 9 of which is adjustable as previously described, and block 34 of which is suitably fixed to the casing 3a and end plate 4a. Accordingly, hollow shaft 7a is fixed to or integral with shaft 2 to rotate therewith, and constant speed universal joint 35 serves to transmit torque from shaft 27a to hollow shaft 7a and shaft 2, shafts 27a and 2 remaining at a predetermined angle with respect to each other.

Figure 5:
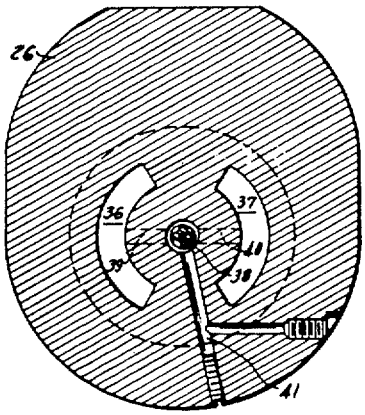
Fig. 5 is a view taken along the line 5—5 of Fig. 4.
Figure 4:
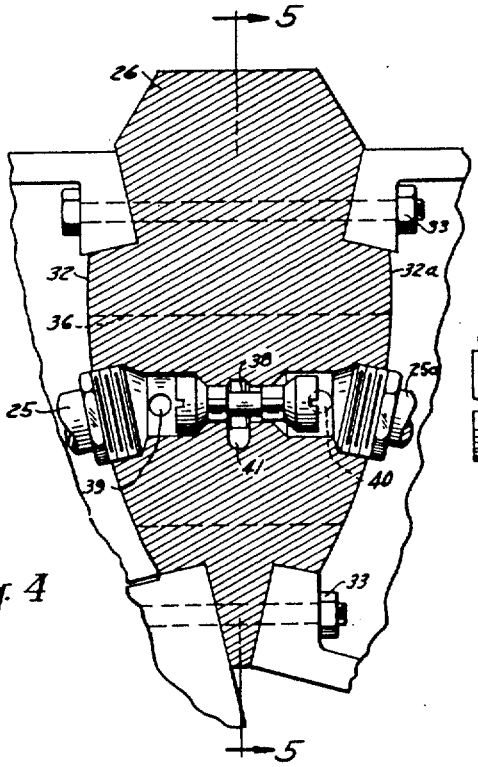
Fig. 4 is a sectional view, with parts in elevation, of a fixed block containing a valve arrangement and providing spherical bearing surfaces for cylinders of the generator and motor units.
Figure 9:
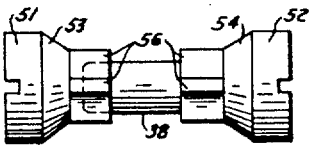
Fig. 9 is a detail view of a shuttle valve[.]

Referring now to Figs. 4 and 5 taken in connection with Fig. 1, valve block 26 is provided with a pair of ports 36 and 37. Fluid is supplied to these ports by means of shuttle valve 38 and passageways 39 and 40 interconnecting the shuttle valve with the ports 36 and 37. Shuttle valve 38 is of a type well known in the art and comprises two head portions 51 and 52 having valve faces 53 and 54 adapted to cooperate with corresponding faces in valve block 26. A stem portion is provided with spaced projecting portions such as 56 to provide a suitable bearing for the valve while at the same time permitting the flow of oil along the stem from the passageway 41 to either of the ports 39 or 40. Fluid under pressure is supplied to the shuttle valve through passageway 41 connected by a pipe or tube (not shown) to port 42 (Fig. 1) through which oil is expelled under pressure as a result of action of impeller 43 suitably attached to shaft 1. The shuttle valve seats alternatively against corresponding faces in block 26, depending upon difference in pressure between ports 36 and 37. Operation of the shuttle valve provides oil from port 42 to the low pressure side of the system for the purpose of replacing fluid which leaks from the high pressure side into the casing. The low pressure side may be connected through either of ports 39 or 40 depending upon the angle of the swash-plate and whether the motor is driving or being driven by the generator.

The fluid bearing constituting a part of the invention has three applications in the present disclosure. These are the valve block facings 32, the connecting rod flange 14, and the half-ball face 16. Taking the latter application as a typical example, it is seen that the bearing face comprises a cup-shaped center portion 46 connected to the cylinder by ducts 44 and 45. The pressure in this cup-shaped portion is substantially the same as in the cylinder. Since groove 47 is connected by ducts 48 and 49 to the interior of the casing, the pressure in the groove is the same as in the casing. The surface of the ball between space 46 and the outside diameter of groove 47 constitutes a dam in respect of which fluid pressure drops from cylinder pressure to casing pressure according to the physical laws of flow of viscous fluid in capillary spaces. The dam is proportioned in such a manner that the resultant of the pressure inside and under the dam is slightly less than the resultant of the piston load along the centerline of the half-ball 13. The load not carried within the outside diameter of the dam is carried on the fluid film between the half-ball and the bearing block in the contact area between the outside of groove 47 and the outside edge of the ball. The upper part of half-ball 13 is provided with a fluid bearing and dam arrangement similar to that shown on the lower part of the half-ball. Thus, portion 50 corresponds to 46, and groove 51 and duct 52 correspond, respectively, to groove 47 and duct 48. Face 31 is provided with a groove 53 and duct 54 similar to groove 47 and duct 48.

In the operation of the device, rotation of the shaft 1, corresponding to rotation of the drive shaft of an engine to which it is connected, will in turn cause operation of the generator unit A to displace fluid in accordance with the adjustment of thrust block 9. The fluid so displaced will in turn result in operation of the motor unit B, by reason of fluid flow through ports 36 and 37, to operate shaft 2. Direction and amount of oil flow is dependent upon adjustment of block 9.

The arrangement comprising the present invention has many advantages over prior constructions. Among these are: the arrangement wherein end thrust of the cylinders and cylinder block arrangements is carried by fluid bearing means—the cylinder block being provided with a spherical surface adapted to bear upon a corresponding surface upon the valve block; the centerline of the cluster of cylinders intersect at a point which serves as a radius for the bearing surface between the cylinder block and the valve block as well as between the thrust block and the individual thrust bearing elements on the connecting rod; the placing of the cylinders on an angle provides a reduced travel for the friction load between the cylinder block and the valve face, as well as improving the hydraulic radius of the passages for hydraulic flow between the generator and motor units; the spherical bearing surfaces also provide that the thrust loads are normal to the bearing surfaces, thereby reducing or avoiding radial loads on the anti-friction type centering bearings; the members 13 in Fig. 2 being curved to correspond to bearing face 17 of member 9, and being substantially freely floating, reduce the necessity for accurate machining of the larger surface since the corresponding bearing surfaces will satisfactorily adjust themselves without undue leakage under the dam portion of part 13; the provision of shaft 27 in Fig. 1 enables block 23 to satisfactorily align itself with respect to its bearing surface.

Although the invention has been described and illustrated in detail, it is to be clearly understood that the same is by way of illustration and example only, and is not to be taken by way of limitation, the spirit and scope of this invention being limited only by the terms of the appended claims.

I claim:

1. [In a hydraulic transmission] A pump comprising a cluster of cylinders forming a cylinder block, pistons [and connecting rods] operatively associated with said cylinders, inlet and outlet ports operatively associated with said cylinders, means for driving said pistons with respect to said cylinders, *said means including complementary bearing surfaces and means to inject fluid therebetween to provide a fluid bearing means for absorbing the thrust load of said pistons, and complementary bearing surfaces and means to inject fluid therebetween to provide a* fluid bearing means for absorbing the axial thrust load of said cylinder block, *said driving means being adjustable to vary the stroke of said pistons from and to a condition of zero stroke,* [and fluid bearing means for absorbing the thrust load of said connecting rods,] the centerlines of said cylinders being inclined to converge at a common point, and [the] *said complementary* surfaces of said two fluid bearing means being concentric with such point in a condition of zero stroke of said pump.

2. [In a hydraulic transmission] A pump comprising open-ended cylinders forming a cylinder block, said cylinder block including a bearing surface, [pistons] *a piston and connecting rod* received in *each of* said cylinders through one of the open ends thereof, a valve block engaged by said bearing surface of said cylinder block and having ports coordinated with the other open ends of said cylinders for passage of fluid therethrough, means for driving said pistons with respect to said cylinders, connecting rod bearings attached to said connecting rods, and a thrust block adapted to be engaged by said connecting rod bearings; *said thrust block being movable for varying the stroke of said pistons from and to a neutral position of zero stroke,* said connecting rod bearings comprising hemispherical members floatingly carried by said connecting rods for engagement by said thrust block, and passageways through said [cylinders,] *pistons,* connecting rods, and bearing members, *arranged to permit passage of fluid from said cylinders to said bearing surfaces* whereby to oppose the thrust loads of said cylinder block and connecting rod bearing members, the centerlines of said cylinders being inclined to converge at a common point, and the bearing surface of said cylinder block and of said thrust block *when in said neutral position* being concentrically curved about such common point.

*3. A pump comprising a cluster of cylinders forming a cylinder block, a piston and connecting rod means operatively associated with each of said cylinders, said means including bearing surfaces, valve block means including inlet and outlet ports operatively associated with said cylinders, said valve block means and said cylinder block having cooperating complementary bearing surfaces, means for rotating said cylinder block, a thrust block having a bearing surface adapted to be engaged by a portion of said piston and connecting rod means bearing surfaces, said thrust block being movable to an angle relative to said cylinder block whereby said piston and connecting rod means are driven with respect to said cylinders upon rotation of said cylinder block, the centerlines of said cylinders being inclined to converge at a common point, the bearing surface of said cylinder block, valve block and thrust block being concentrically curved about such common point.*

*4. A pump comprising a cluster of cylinders forming a cylinder block, said cylinder block having a bearing surface, a piston and rod means operatively associated with each of said cylinders, said rod means including a bearing surface, means for rotating said cylinder block, valve means, said valve means including a surface complementary to said cylinder block bearing surface and communicating with said cylinders to obtain fluid under pressure therefrom to provide a fluid bearing means for absorbing the axial thrust load of said cylinder block, said valve means further including inlet and outlet ports therein operatively associated with said cylinders, and a thrust block including a bearing surface, said thrust block bearing surface being complementary to said rod means bearing surface, said piston and rod means including means for injecting fluid under pressure from said cylinders between said rod means bearing surface and said thrust block bearing surface to provide a fluid bearing means for absorbing the thrust load of said piston and rod means, said thrust block being angularly adjustable with respect to said cylinder block whereby rotation of said cylinder block drives said piston and rod means with respect to said cylinders, the centerlines of said cylinders being inclined to converge at a common point, and said bearing surfaces being concentric with such point in a condition of zero stroke of said pump.*

References Cited in the file of this patent or the original patent

UNITED STATES PATENTS

| | | |
|---|---|---|
| Re. 20,026 | Thoma | June 30, 1936 |
| 1,152,729 | Hele-Shaw | Sept. 7, 1915 |
| 1,263,180 | Williams | Apr. 16, 1918 |
| 1,274,391 | Davis | Aug. 6, 1918 |
| 1,308,844 | Ferris et al. | July 8, 1919 |
| 1,840,872 | Rayburn | Jan. 12, 1932 |
| 1,996,994 | Grubb | Apr. 9, 1935 |
| 2,043,111 | Meyer | June 2, 1936 |
| 2,241,701 | Doo | May 13, 1941 |
| 2,272,771 | Hawley | Feb. 10, 1942 |
| 2,292,125 | Ifield | Aug. 4, 1942 |
| 2,296,929 | Ifield | Sept. 29, 1942 |
| 2,299,235 | Snader | Oct. 20, 1942 |
| 2,371,974 | Neuland | Mar. 20, 1945 |
| 2,483,856 | Templo | Oct. 4, 1949 |